United States Patent [19]
Yi

[11] Patent Number: 5,327,316
[45] Date of Patent: Jul. 5, 1994

[54] POWER TERMINAL PROTECTION DEVICE

[75] Inventor: Yung K. Yi, Upper Marlboro, Md.

[73] Assignee: The United States of America as represented by the Secretary of the Navy, Washington, D.C.

[21] Appl. No.: 594,751

[22] Filed: Oct. 9, 1990

[51] Int. Cl.$^5$ .............................................. H02H 7/20
[52] U.S. Cl. ...................... 361/56; 361/111; 361/118; 361/816
[58] Field of Search ................ 361/54, 56, 58, 91, 361/111, 118; 315/238

[56] References Cited

U.S. PATENT DOCUMENTS

| | | | |
|---|---|---|---|
| 3,683,234 | 8/1972 | Rodewald | 315/238 |
| 4,259,705 | 3/1981 | Stifter | 361/56 |
| 4,539,610 | 9/1985 | Delaney et al. | 361/91 |
| 4,587,588 | 5/1986 | Goldstein | 361/56 |
| 4,669,027 | 5/1987 | Elsner et al. | 361/111 |
| 4,703,386 | 10/1987 | Speet et al. | 361/56 |

Primary Examiner—A. D. Pellinen
Assistant Examiner—S. Jackson
Attorney, Agent, or Firm—Kenneth E. Walden; Jacob Shuster

[57] ABSTRACT

Metal oxide varistors are connected in parallel with grounded capacitors to load outlet terminals coupled to a power source through inductor coils forming a low pass filter with the capacitors to delay propagation of a voltage increasing transient pulse to the power source until ground shunting paths of low resistance are developed in the varistors. Electromagnetic shielding partitions the inductor from the capacitors and varistors within a power outlet box mounting the load outlet terminals to prevent interference with absorption of transient energy by the varistors during the delay in establishing the ground shunting paths.

10 Claims, 2 Drawing Sheets

POWER TERMINAL PROTECTION DEVICE

BACKGROUND OF THE INVENTION

This invention relates generally to the protection of an electrical power source from excessive transient voltages at the power terminal to which it is coupled.

Electrical transient pulses generated electromagnetically or by lightning strikes have heretofore been propagated from power outlet boxes to their power source with serious damage consequences from excessively high voltages. Protective circuitry for dealing with excessively high electrical voltages is generally well known as disclosed for example in U.S. Pat. Nos. 3,017,564, 3,683,234 and 4,539,617 to Barney, Rodewald and Delaney et al., respectively. The location of the protective circuitry between a power source and electrical loads is furthermore disclosed in the Barney and Delaney et al. patents. According to the Barney patent, a protective circuit is designed to protect a load from damage due to excessively high voltage under control of a load responsive relay. According to the Delaney et al. patent, transient pulse suppression on an AC power line is effected by a protective circuit between an AC load and a power line terminal involving a bidirectional diode arrangement to provide threshold shunting in association with low pass filtering.

It is an important object of the present invention to provide transient voltage suppressing circuitry adapted to be fitted into a power outlet box into which electrical loading is plugged in order to prevent damaging propagation of transient pulses from the power outlet box to the power source to which the box is coupled.

SUMMARY OF THE INVENTION

In accordance with the present invention, an inductor within a power outlet box is electrically shielded from other components of transient voltage suppression circuitry, including an associated arrangement of capacitors forming a low pass filter with the inductor, to prevent electromagnetic interference with establishment of ground shunting paths through varistors in the circuitry. The varistors are of a well known metal-oxide type whose resistances are dependent upon voltage applied. Low resistances are thus developed by the varistors to establish the ground shunting paths in delayed response to transient pulses applied above a threshold voltage limit. Propagation of such transient voltage pulses to the power source are delayed by the low pass filter to prevent damage to the power source while the varistors are developing their low resistances. The varistors are thereby effective in combination with the low pass filtering capacitors to absorb most of the transient energy involved.

BRIEF DESCRIPTION OF DRAWING FIGURES

Other objects, advantages and novel features of the invention will become apparent from the following detailed description of the invention when considered in conjunction with the accompanying drawing wherein.

DETAILED DESCRIPTION OF THE PREFERRED EMBODIMENT

Figure 1:
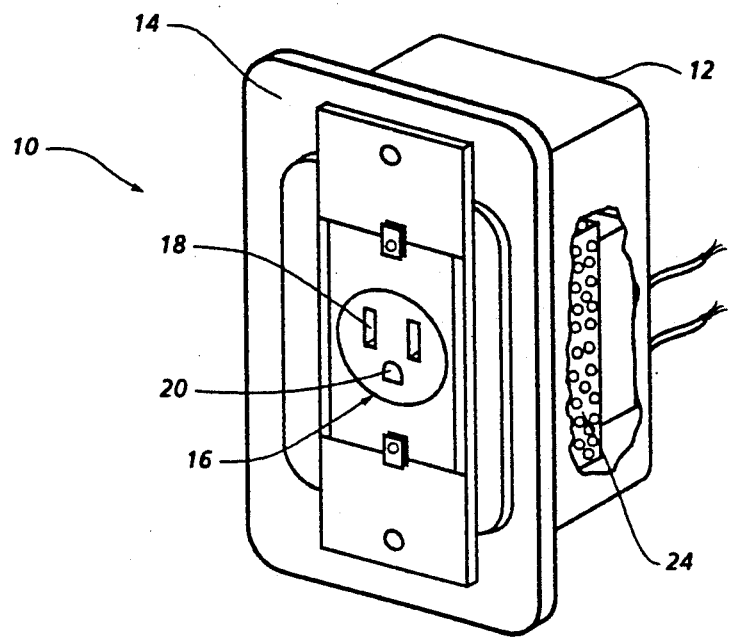
FIG. 1 is a perspective view of a power outlet box with which the present invention is associated.

Referring now to the drawing in detail, FIG. 1 illustrates a typical power outlet device, generally referred to by reference numeral 10, with which the present invention is associated. The outlet device as shown includes a box housing 12 projecting rearwardly from a mounting plate 14 exposing the face of a plug-in power terminal 16 having a pair of load connector receptacles 18 and a ground connector receptacle 20 associated therewith. As diagrammed in FIG. 2, the power terminal 16 is adapted to be electrically coupled by transient suppressing circuitry within the housing 12 to a source of electrical power 22, such as a 120 VAC power source. An electromagnetic shielding enclosure 24 within the housing 12 as shown in FIG. 1, is associated with the transient suppression circuitry as will be explained hereinafter.

Figure 2:
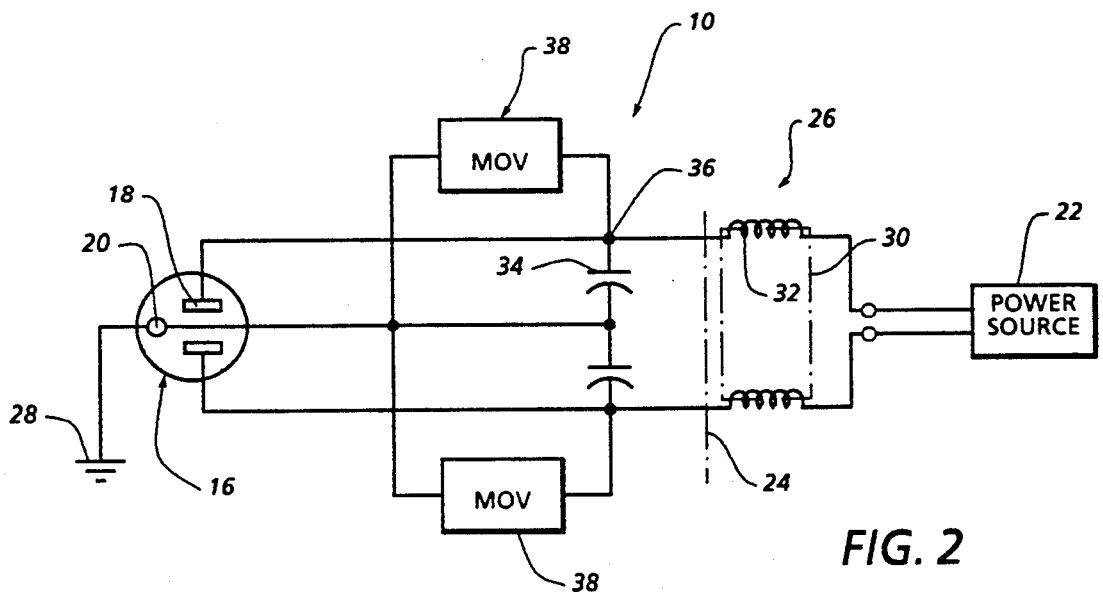
FIG. 2 is a circuit diagram of the protective circuitry arrangement of the present invention in association with the power outlet box and power source.

The transient suppression circuitry as diagrammed in FIG. 2 includes an inductor 26 interconnecting the power source 22 with the load connector receptacle 18 of the power terminal 16 having its ground connector receptacle 20 connected to ground 28. The inductor 26 may be of a generally well known type having a ferrite core 30 on which a pair of inductance coils 32 of 14 gauge wire are wound. The inductance coils 32 are electrically connected in series between the power source 22 and the load connector receptacles 18. A pair of grounded capacitors 34 are respectively connected to loading junctions 36 between the inductance coils 32 and the power terminal 16. Such capacitors 34 form a low pass filter with the inductor 26 to regulate increase in current, having a 200 VDC limiting capacity for example, to handle transient voltages substantially higher than that of the power source.

The low pass filter formed by inductor 26 and capacitors 34 acts to delay an otherwise rapid increase in voltage caused by propagation of transient pulses. Thus, further propagation of a fast rising transient pulse is blocked by the inductance coils 32 and shunted to ground through the capacitors 34. However, since the capacitors 34 have some parasitic inductance all of the transient energy associated with such pulse to be shunted to ground cannot be absorbed by the capacitors 34 alone. In accordance with the present invention, most of such transient energy is absorbed by the capacitors 34 in combination with a pair of variable impedance devices, such as metal oxide varistors 38 of a generally known type marketed for example by the General Electric Corporation under designation as MOV part No. V150LA10A.

Figure 3:
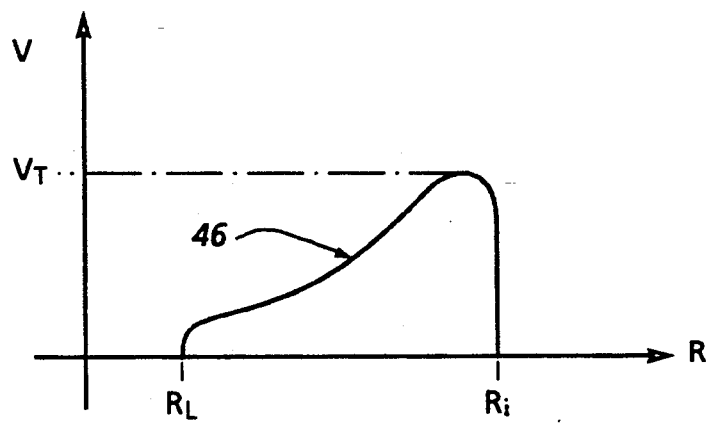
FIG. 3 is a graphical illustration of certain characteristics of the varistors associated with the protective circuitry of FIG. 2.

As diagrammed in FIG. 2, each of the varistors 38 establishes a ground shunting path between ground 28 and the loading junction 36 in parallel with a capacitor 34. The ground shunting paths are established through the varistors 38 only when the resistances thereof are decreased from an initially high value of $(R_i)$ to a relatively low value $(R_L)$ in response to rise in voltage at junction 36 above a threshold level $(V_T)$ as graphically depicted by curve 46 in FIG. 3. Such resistance decreasing action of varistors 38 however requires some interval of time, as will be apparent from the gradual nature of the resistance decreasing curve 46 depicted in FIG. 3. The required interval of time for developing the low resistance ground shunting paths is tolerated without exposing the power source 22 to excessively high amplitude transient voltage above the threshold level ($V_T$) at junctions 36 by the initial pulse rise delay action of the low pass filter formed by the inductor 26 and capacitors 34 as aforementioned. Thus, the transient suppression circuitry described is capable of shunting extremely rapid rising pulses in the order of 7000 volts per nanosecond, for example.

Figure 4:
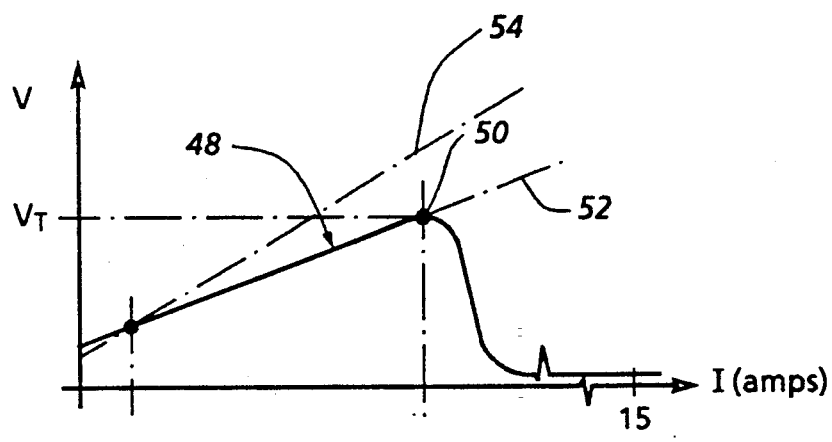
FIG. 4 is a graphical illustration of transient voltage suppression characteristics of the circuitry diagrammed in FIG. 2.

FIG. 4 graphically depicts a curve 48 representing the build up of a transient pulse voltage at the power terminal 16 of the device 10 to a threshold limit peak 50. Such build-up occurs at a delayed rate, reflected by line 52 in FIG. 4, as compared to the pulse rise rate without protection as reflected by line 54. As shown, the voltage under delayed rise to peak 50 drops sharply as current continues to increase under persisting transient conditions up to as much as 15 amperes, for example.

An important aspect of the present invention enabling performance of its transient protective actions hereinbefore described, involves avoidance of the adverse affects of electromagnetic interference on the shunting capability of the varistors 38. Thus, the inductor 26 is electromagnetically shielded from the low pass filtering capacitors 34 and varistors 38 by a package partitioning arrangement within housing 12 formed by shield 24 as shown in FIG. 1 and diagrammed in FIG. 2. Such shielding prevents electromagnetic interference with the absorption of transient energy by the varistors 38 during the aforementioned initial development and establishment of the low resistance ground shunting paths.

Numerous other modifications and variations of the present invention are possible in light of the foregoing teachings. It is therefore to be understood that within the scope of the appended claims the invention may be practiced otherwise than as specifically described.

What is claimed is:

1. In combination with an electrical power source and an outlet device having power terminal means for transferring voltage thereat to a load and inductance means coupling the source to the power terminal means for regulating increase in current conducted therebetween; transient suppression means for protecting the source from transient voltage above a threshold level at the power terminal means including: capacitor means connected to the inductance means for delaying supply of the transient voltage to the source, impedance means connected in parallel relation to the capacitor means for development of a shunt path in response to said transient voltage at the power terminal means, and shielding means electromagnetically separating the inductance means from the capacitor means for preventing interference with absorption of transient energy by the impedance means during said development of the shunt path.

2. The combination of claim 1 wherein said impedance means includes a pair of metal oxide varistors having resistances which decrease from an initial high value to a low ground shunting value during said development of the shunt path.

3. The combination of claim 2 wherein said power terminal means includes a pair of load connecting receptacles connected to the capacitor means in parallel with the impedance means.

4. The combination of claim 3 wherein said inductance means includes a ferrite core and a pair of inductance coils wound on the core interconnecting the power source with said load connecting receptacles of the power terminal means.

5. The combination of claim 4 wherein the power outlet device further includes a housing on which the receptacles of the power terminal means are mounted and enclosing the inductance, capacitor and impedance means, the inductance means being partitioned within the housing from the capacitor and impedance means by the shielding means.

6. The combination of claim 1 wherein the power terminal means includes a pair of load connecting receptacles connected to the capacitor means in parallel with impedance means.

7. The combination of claim 6 wherein said inductance means includes a ferrite core and a pair of inductance coils wound on the core interconnecting the power source with said load connecting receptacles of the power terminal means.

8. The combination of claim 6 wherein the power outlet device further includes a housing on which the receptacles of the power terminal means are mounted and enclosing the inductance, capacitor and impedance means, the inductance means being partitioned within the housing from the capacitor and impedance means by the shielding means.

9. In combination with an electrical power source and an outlet device having power terminal means for transferring voltage thereat to a load and inductance means coupling the source to the power terminal means for regulating increase in current conducted therebetween; transient suppression means for protecting the source from transient voltage above a threshold level at the power terminal means including: capacitor means connected to the inductance means for supply of the transient voltage to the source delayed by a predetermined period of time, impedance grounding means connected to the inductance means in parallel relation to the capacitor means for decreasing resistance to ground during said predetermined period of time in response to the transient voltage at the power terminal means, a housing mounting the outlet device and shielding means electrically partitioning the inductance means from the capacitor and impedance means within the housing.

10. The combination of claim 9 wherein the impedance means comprises a metal oxide varistor.

* * * * *